United States Patent [19]

Maeda

[11] Patent Number: 4,811,139
[45] Date of Patent: Mar. 7, 1989

[54] DEVICE FOR RECORDING AND REPRODUCTION HAVING HEAD MOVING MEANS

[75] Inventor: Masaya Maeda, Kanagawa, Japan

[73] Assignee: Canon Kabushiki Kaisha, Tokyo, Japan

[21] Appl. No.: 153,475

[22] Filed: Feb. 2, 1988

Related U.S. Application Data

[63] Continuation of Ser. No. 784,800, Oct. 4, 1985, abandoned.

[30] Foreign Application Priority Data

Oct. 9, 1984 [JP] Japan ................................. 59-211847

[51] Int. Cl.⁴ ............................................. G11B 5/016
[52] U.S. Cl. ................................ 360/77.02; 360/109; 360/97.01
[58] Field of Search ........................... 360/109, 97–99, 360/106, 105, 75, 77–78, 137, 86; 358/906, 909

[56] References Cited

U.S. PATENT DOCUMENTS

| 4,133,015 | 1/1979 | Butsch | 360/109 |
| 4,410,922 | 10/1983 | Babow et al. | 360/109 |
| 4,507,696 | 3/1985 | Hütter | 360/109 |
| 4,550,352 | 10/1985 | Nakao | 360/109 |
| 4,562,501 | 12/1985 | Cantwell | 360/109 |

Primary Examiner—Stuart N. Hecker
Assistant Examiner—David J. Severin
Attorney, Agent, or Firm—Toren, McGeady & Associates

[57] ABSTRACT

A device for recording and reproduction having a recording and reproducing head, a disk driving mechanism, a head moving mechanism for moving the head relative to the medium, a manual actuator to start recording of a signal, an adjusting mechanism for the tracking adjustment of the head, and a control mechanism for enabling the operation of the manual actuator to be effective only when the adjusting mechanism is set at a predetermined condition.

22 Claims, 5 Drawing Sheets

DEVICE FOR RECORDING AND REPRODUCTION HAVING HEAD MOVING MEANS

This is a continuation of application Ser. No. 784,800, filed Oct. 4, 1985, now abandoned.

BACKGROUND OF THE INVENTION

1. Field of the Invention

This invention relates to devices for recording and reproduction and more particularly, to devices for recording and reproduction having record bearing medium drive means and head moving means.

2. Description of the Prior Art

In the video recording and reproducing apparatus using a disc-shaped record bearing medium, for example, a magnetic disc, while the record bearing medium is rotating at a corresponding speed to the field or frame frequency of television, the recording and reproducing head is moved in such a way that the video signals are recorded in concentric tracks or in a helical track, and the thus-recorded magnetic disc is to be treated similarly when in reproduction. Recently, however, because the quality of the record bearing medium and the performance of the recording and reproducing head have been improved to increase the recording density, as the width of the recording track and the track pitch decrease, the tolerance of each part of the recording and reproducing apparatus and the change of the dimensions of the magnetic disc with temperature and humidity get more responsible for the position error of the recorded tracks when in reproduction, and therefore it becomes more difficult to expect reproduction of images of good quality.

To cope with such a drawback, apparatus of this kind necessarily include tracking means for finely adjusting the position of the recording and reproducing head relative to the tracks of the record bearing medium when in reproduction.

It should be pointed out that when such an apparatus is switched to the recording mode again, the operator needs to bring the recording and reproducing head back to the absolute reference recording position. If this step of operation is overlooked, a problem arises that a recording starts with the recording and reproducing head off-set from the absolute reference track.

SUMMARY OF THE INVENTION

With such situations in mind, the present invention has been made, and its general object is to provide a novel device for recording and reproduction which can eliminate the drawbacks of the prior art.

Another object of the invention is to provide a device for recording and reproduction which can prevent recording from occurring under the condition that the recording and reproducing head is out of registry with the prescribed position for recording caused by the tracking adjustment when in reproduction, and therefore can assure good interchangeability of the record bearing medium between apparatus.

Under these objects, according to one aspect of the present invention, a device for recording and reproduction comprises a recording and reproducing head, means for driving a record bearing medium, means for moving the head relative to the record bearing medium, actuating means for recording, manually operable means for finely moving the head to make tracking adjustment, and control means for enabling operation of the actuating means to be effective only when the manually operable means is set at a predetermined position.

In one embodiment of the present invention as applied to the recording and reproducing apparatus, the device of the invention can take the built-in form. In the alternative, it may otherwise be constructed in the form of a stand alone unit. In this case, an auxiliary unit for recording and another auxiliary unit for reproduction must be provided. In application to the recording apparatus, it is also possible to use the built-in form. In this case, an auxiliary unit for reproduction should be provided. Conversely, when applied to the reproducing apparatus with the use of the built-in form, an auxiliary unit for recording should be provided. It is to be noted that the auxiliary unit for recording can be included with signal generating or source means, and the auxiliary unit for reproduction can be included with output means such as display means or printer means, etc., or interface means therefor.

Other objects, aspects and features of the invention will become apparent from the following description of embodiments thereof with reference to the accompanying drawings, in which:

DETAILED DESCRIPTION OF THE PREFERRED EMBODIMENTS

Figure 1A:
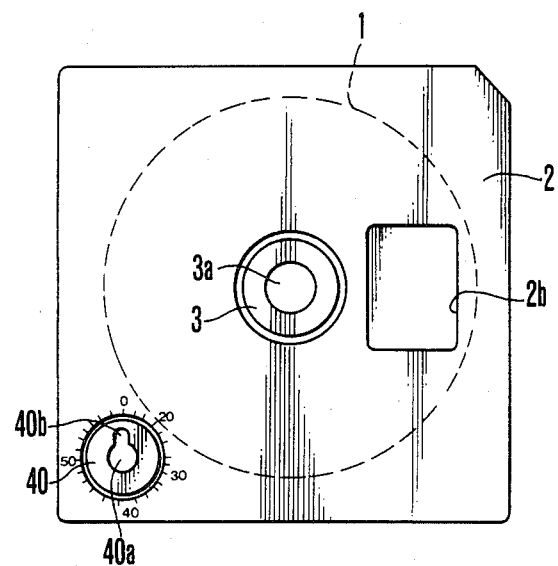
FIG. 1A is a top plan view of a cassette.

In FIG. 1A, a flexible disc-shaped record bearing medium in the form of a magnetic disc 1 is contained in a cassette 2 made of resin or the like and formed in a flat box-like shape, and has a center hub 3 made of plastic with a hole 3a to be fitted on a spindle 14a of an electric motor 14, as will be fully described by reference to FIG. 4. The magnetic disc 1 is rotated by the motor 14 through the center hub 3. In a case according to the NTSC system, because the field frequency is 60 Hz, to record TV signals for one field in one revolution of the magnetic disc 1, the rate of revolution of the magnetic disc 1 is chosen at 3,600 rpm, thereby one field is recorded or reproduced on or from one track.

Figure 1B:
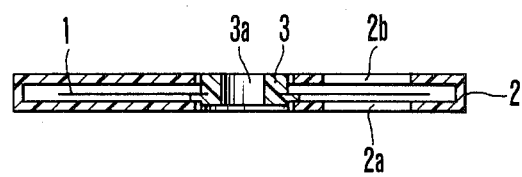
FIG. 1B is a sectional view of the cassette.

The lower surface of the cassette 2 is provided with an apertured portion 2a shown in FIG. 1B through which a recording and reproducing head (see FIG. 4) enters either to contact, or to confront, the magnetic disc 1. In alignment with this magnetic head entrance window (apertured portion 2a), there is another apertured portion 2b provided through the wall of the upper panel of the cassette 2 to allow a stabilizing plate (not shown) to enter so that good contacting or confronting relationship of the magnetic head 15 with the magnetic disc 1 is maintained. A counter 40 is rotatably supported in a portion of the housing of the cassette 2, indicating the number of recorded tracks on the magnetic disc the number of additional recordable tracks. To advance the counter 40 stepwise, a drive shaft 37 with a key 37a, shown in FIG. 4, is inserted into a hole 40b with a detent groove 40a.

Figure 2:
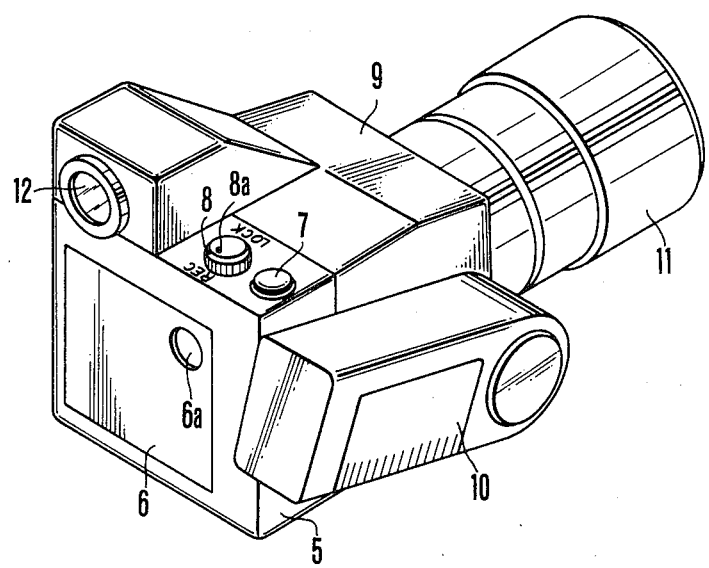
FIG. 2 is a perspective view of an embodiment of a device for recording and reproduction according to the present invention applied to an electronic camera.

In FIG. 2, as an example of the auxiliary unit for recording, there is shown an electronic camera having a body 9, a grip 10, a picture-taking lens 11 and a finder 12.

5 is a device therein for recording and reproduction according to the present invention in the form of a unit releasably attached to the electronic camera body 9. To insert or remove the cassette 2, a lid 6 is opened and closed by an operator's finger engaging a hole 6a. A recording actuator or button 7 is provided for initiating a recording operation in which video signals, representing an object image formed with light entering through the picture taking lens 11, are produced from the electronic camera and recorded on the magnetic disc 1. A tracking dial 8, as the manually operable means for tracking adjustment, is rotatable to place its index mark 8a in registry with either a "REC"-labelled position or a "LOCK"-labelled position. With this tracking dial 8 in registry with the "REC" position, when the recording button 7 is pushed down, the recording operation is initiated. It is for this time that the magnetic head 15 is positioned at the absolute reference recording position of the magnetic disc 1. If the tracking dial 8 is out of registry with the "REC" position, the depression of the recording button 7 has no effect and it is impossible to carry out recording.

Figure 3:
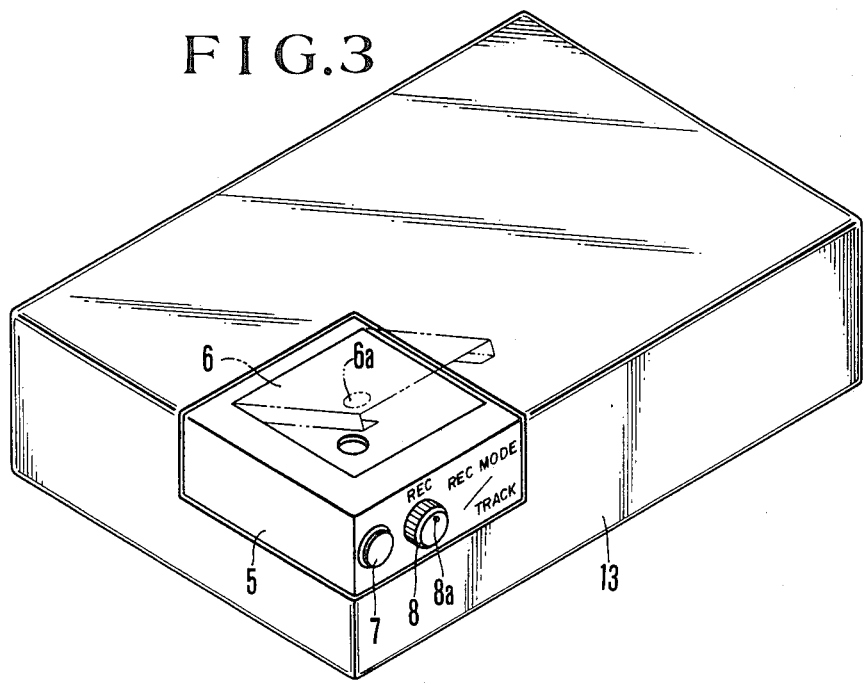
FIG. 3 is a perspective view of the device of FIG. 2 when set in the reproducing apparatus.

In FIG. 3, the auxiliary unit for reproduction has a body 13 to which the device 5 for recording and reproduction, as detached from the electronic camera body 9 of FIG. 2, is attached to reproduce the video signals from the magnetic disc 1 in the device 5. Reference numerals 6, 6a, 7, 8 and 8a denote the similar parts to those shown in FIG. 2. After the device 5 has been attached to the body of the auxiliary unit 13 and before a reproducing operation is initiated, the operator needs to adjust the position of the magnetic head 15 to the recording track of the magnetic disc 1. This so-called "tracking" process comprises the steps of turning the tracking dial 8 to place its index mark 8a in registry with the "LOCK"-labelled position of FIG. 2 and then making a slight excursion of the dial 8, while this position being taken as the center.

Figure 4:
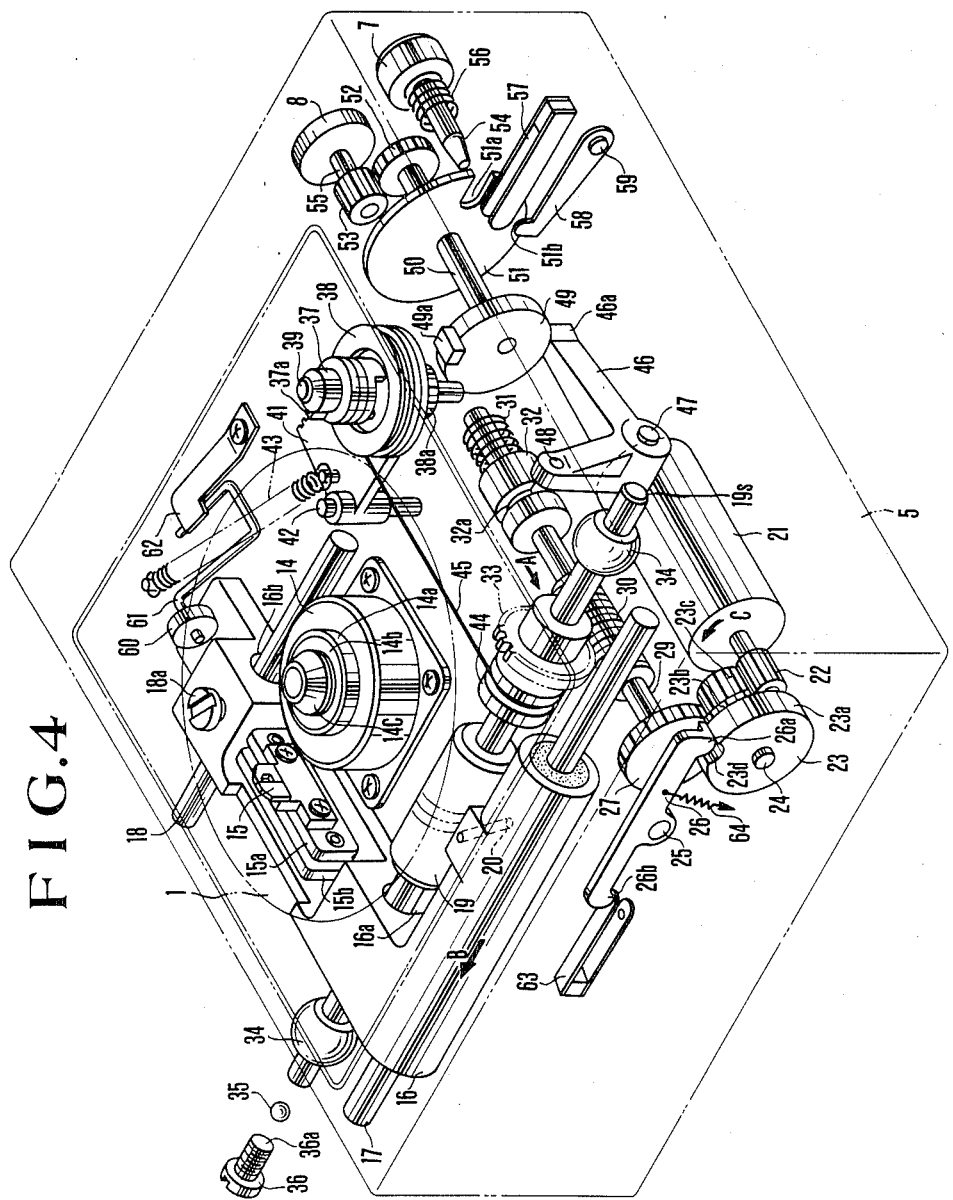
FIG. 4 is a perspective view of a practical example of the device for recording and reproduction of the invention.

Referring to FIG. 4, the internal mechanisms of the device 5 will next be described.

An electric motor 14 has an output shaft 14c on which a spindle 14a is fixedly mounted through a ring shaped permanent magnet 14b. The magnet 14b has a function of checking and locating the center hub 3 of FIG. 1 on the reference surface of the spindle 14a when the central hole 3a of the hub 3 is put on the shaft 14c, a soft magnetizable plate (not shown) buried in the bottom surface of the center hub 3 being attracted by the permanent magnet 14b.

The means for moving the head 15 stepwise by a prescribed pitch includes a stepping motor 21 having an output shaft on which a pinion 22 is mounted, a click gear 23 meshing with the pinion 22, a gear 27 meshing with the gear 23, a worm gear 30 on a common shaft of the gear 27, a worm wheel 33 meshing with the worm gear 30, a screw 19 on a common shaft of the wheel 33, and a head carrier 16 having a pin 20 in engagement with the screw 19. As the driving torque of the stepping motor 21, as the drive source, is transmitted to the carrier 16, the head 15 moves a predetermined pitch-by-pitch in a direction parallel to the radius of the magnetic disc 1.

The click gear 23 is rotatably mounted on a shaft 24 fixedly mounted to a chassis (not shown) of the device 5 and is constructed with a click cam 23a having a detent slot 23d cut in the peripheral surface thereof, and large and small gears 23b and 23c fixedly secured to each other and to the click cam 23a in concentric relation, the large gear 23b meshing with the pinion 22 and the small gear meshing with the gear 27. A click lever 26 is rotatable about a pivot pin 25 fixedly secured to the chassis. A coil spring 64 urges the lever 26 is a clockwise direction so that a lever nose 26a abuts on the camming surface. When the lever nose 26a drops in the detent slot 23d, the click cam 23a is locked. When the stepping motor 21 starts to rotate in a direction indicated by arrow C, the driving torque first releases the click cam 23a from the locking connection through the pinion 22 and large gear 23b as the slot 23d moves away from the nose 26a while lifting the latter to turn the lever 26 against the spring 64, thereby a normally open type switch 63 is closed in due to engagement with the tail of the lever 26.

Then, when the click cam 23a has rotated just one revolution, rotation of the click gear 23 is stopped by the lever nose 26a engaging the slot 23d, and as, at this time, the switch 63 is opened, the energization of the stepping motor 21 is stopped. Thus, the head 15 on the carrier 16 is advanced through the length of one prescribed pitch in the direction parallel to the radius of the magnetic disc 1. In such a manner, the position of each track to be recorded is indexed accurately.

A shaft 29 on which are fixedly mounted the gear 27, the worm gear 30 and an engaging member 32, having a circumferential groove 32 into which a pin 48 extends from a bell crank 46 cooperative with the tracking dial 8, is urged by a compressed coil spring 31 in a direction indicated by arrow A to absorb any backlash between the worm gear 32 and the worm wheel 33.

Another shaft 19S, on which are fixedly mounted the worm wheel 33, a capstan 44, to which is connected one end of a wire 45 after a prescribed number of turns thereon, the opposite end of which is connected to a reel 38 for the counter 40 of FIG. 1 after a prescribed number of turns thereon, and the screw 19, is rotatably supported at both ends on bearings 34.

An adjusting screw 36 is arranged with its tip face 36 to engage the face of one end of the shaft 19S through a steel ball 35 so that when in the assembly line for the device 5, the axial position of the shaft 19S can be finely adjusted by turning the screw 36 to bring the magnetic head 15 into coincidence with the absolute reference recording position through the screw 19, engaging pin 20 and carrier 16.

The head carrier 16 is slidably mounted on a guide shaft 17 and has support members 15a and 15b for the magnetic head 15, and two cutouts 16a and 16b through which the shaft 19S and another guide shaft 18 pass, respectively. A roller 60 is rotatably mounted on a bent-off portion of a substantially "U"-shaped member 61 fixedly mounted to the free end of a leaf spring 62 of which the opposite end is fixedly mounted on the chassis. Because the roller 60 pushes the free end of the carrier 16, the cutout 16b rests on the second guide shaft 18. An adjusting screw 18a has its tip abutting on the guide shaft 18 within the cutout 16b. Therefore, when the screw 18a is turned, the angular position of the carrier 16 about the first guide shaft 17 can be finely adjusted. This leads to adjustment of the inclination of the magnetic head 15 to the magnetic disc 1. Also in a direction indicated by arrow B, this carrier 16 is urged by a spring (not shown) to press the face of the end of the screw shaft 19S against the face of the end of the adjusting screw 36 through the steel ball 35. Therefore, the carrier 16 is biased to the direction B under the condition that the backlash between the pin 20 and the screw 19 is absorbed.

Next, counter drive means is described. A counter shaft 37 inserts into the counter hole 40a of the counter 40 provided in the cassette 2 and has a key portion 37a to engage in the key groove 40b of the counter 40. A counter reel 38, rotatable as a unit with the counter shaft 37, is provided with a gear 38a meshing with a sector gear 41, and is rotatably supported on a shaft 39 fixedly mounted to the chassis along with the counter shaft 37. The sector gear 41 meshing with the gear 38a is rotatably supported on a shaft 42 fixedly mounted to the chassis, and is connected to one end of a tension coil spring 43, of which the other end is connected to the chassis to urge the sector gear 41 in a counterclockwise direction. Therefore, the counter reel 38 is urged in a clockwise direction. For this reason, through the wire 45 whose ends are convoluted a number of times on the counter reel 38 and the capstan 44, the capstan 44 is urged in a clockwise direction. And when the capstan 44 is turned in the counterclockwise direction by the stepping motor 21, the capstan 44 winds in the wire 45 to advance the counter reel 38 in the counterclockwise direction, and the counter 40, which is driven to rotate by the counter drive shaft 37, is advanced in the counterclockwise direction, indicating the number of tracks recorded, or the number of the track to be next recorded. Next described is the manually operable means for tracking adjustment. When in reproduction, tracking is carried out with the operation of the actuating means for recording being simultaneously rendered ineffective, and when in recording, the magnetic head is positioned in the absolute reference recording position, while the operation of the actuating means for recording is simultaneously rendered effective.

This manually operable means for tracking adjustment includes a gear 53, another gear 52, a release lock plate 51 having a click notch 51b and a slit 51a, an eccentric cam 49 and a bell crank 46 having a pin 48 in engagement with an engaging groove 32a of the engaging member 32.

The tracking dial 8 is connected to the gear 53 through a shaft 55. This gear 53 meshes with the gear 52 fixedly mounted to one end of a shaft 50 on which is fixedly mounted the release lock plate 51. Fixedly mounted to the other end of the shaft 50 is the eccentric cam 49 provided with a stopper 49a fixedly mounted on the peripheral surface thereof and arranged to hinder the release lock plate 51 from rotating more than one revolution.

7 is the recording actuator means for causing the magnetic head 15 to perform recording, or the recording button, with a return spring 56 around a pin 54 thereof.

A click lever 58 is arranged to engage in the notch 51b of the release lock plate 51 and is rotatably mounted on a pin 59 fixedly mounted to the chassis. A spring (not shown) urges the lever 58 in a clockwise direction.

A normally open recording trigger switch 57 is arranged to align with the pin 54 of the recording button 7 through the slit 51a when the mark 8a on the tracking dial 8 is in registry with the "REC"-labelled position of FIG. 3 where the release lock plate 51 is latched by the click lever 58 with its nose in engagement with the click notch 51b. It should be noted that at this time, the magnetic head 15 is positioned in the absolute reference recording position of the magnetic disc 1. Then, when the recording button 7 is pushed inwards, its pin 54 moves past the slit 51a to close the switch 57, thereby a recording trigger signal is produced, initiating a recording operation.

The bell crank 46 is rotatable about a pivot pin 47 fixedly mounted to the chassis, and has an arm 46a in abutting engagement on the periphery of the eccentric cam 49 and another arm on which is fixedly mounted a pin 48 engaging in the groove 32a of the engaging member 32. As has been described above, the engaging member 32 is urged in the direction of arrow A by the compressed spring 31. Therefore, this bias force is received by the pin 48 also, urging the bell crank 46 in the counterclockwise direction.

As has been described above, only when the mark 8a on the tracking dial 8 is in registry with the "REC"-labelled position does the recording button become possible to operate as shown in FIG. 4. When the mark 8a is moved to any position other than the "REC"-labelled position, tracking becomes possible to perform. In this state, when the tracking dial 8 is turned, the eccentric cam 49 is turned, thereby the arm 46a of the bell crank 46 is moved up and down. Thereby, the bell crank 46 is turned about the pivot pin 47 in the clockwise or counterclockwise direction. This movement is transmitted through the pin 48 engaging in the groove 32a to axially move the engaging member 32 along with the shaft 49 and the worm gear 30. Axial movement of the worm gear 30 is transmitted to rotative movement of the worm wheel 33 and therefrom by the screw 19-and-pin 20 connection to minute linear movement of the head carrier 16 in the direction parallel to the radius of the magnetic disc 1. Thus, the magnetic head 15 is adjusted in position relative to the recording tracks on the magnetic disc 1.

The operation of the device 5 of such construction is described in connection with each of the cases when in use with the electronic camera body 9 to record video signals of an object image, and when in use with the auxiliary unit body 13 to reproduce the video signals.

When recording video signals of an object, the device 5 for recording and reproduction is attached to the body of the electronic camera 9 shown in FIG. 2, and the tracking dial 8 is then turned to place its mark 8a in registry with the "REC"-labelled position. It is in this state that as shown in FIG. 4, the release lock disc 51 is set in a click-stopped position by the nose of the lever 58 engaging in the notch 51b and clears the path of movement of the pin 54 to the switch 57 as the slit 51a comes in the path. At the same time, the eccentric cam 49 takes a certain angular position and is held stationary therein. This determines the position of the bell crank 46. Therefore, the engaging member 32 is held in a prescribed axial position. Then, as the stepping motor 21 rotates, the click cam 23a is latched in every one revolution by the lever nose 26a engaging in the detent slot 23d of the cam 23a, moving the magnetic head 15 accurately one track pitch-by-pitch. Such an indexing operation of the position of the recording track is recycled until the counter 40 reaches its null position. Motion of the gear 27 is transmitted through the worm gear 30-and-wheel 33 to rotate the capstan 44. The rotating capstan 44 winds in the wire 45, while the counter reel 38 winds it off. For every one revolution of the click cam 23a, therefore, the drive shaft 37 rotates the counter 40 one pitch. Also through the screw 19-and-pin 20 connection, the carrier 16 is moved one pitch in the direction parallel to the radius of the magnetic disc 1 toward the absolute reference recording position. With the magnetic head 15 in the absolute reference recording position, when the recording button 7 is then pushed down, its pin 54 moves past the slit 51a of the release lock disc 51 to close the switch 57, thereby a signal processing circuit (not shown) is rendered operative, initiating a recording operation.

After termination of the recording operation, the device 5 is detached from the body 9 of the electronic camera, and then attached to the body 13 of the auxiliary unit for reproduction as shown in FIG. 3. It should be noted here that as has been mentioned above, when assembling, with the release lock disc 51 assuming the "REC"-position where the slit 51a is just opposite to the pin 54 of the recording button 7, the adjusting screw 36 is finely operated so as to bring the magnetic head 15 into alignment with the absolute reference recording position of the magnetic disc 1. After the completion of such position adjustment of the magnetic head 15, as high a tracking accuracy as corresponding to the gear tolerance of the gear train from the large gear 23b through the small gear 23c, gear 27, worm gear 30 and worm wheel 33 to the screw 19 is assured. Under the normal condition, therefore, it is always with this accuracy that the setting of the magnetic head 15 to the absolute reference recording track is resulted. And, recording of the absolute reference track is possible to perform.

However, because the tolerances of the constituent parts of the moving mechanism for the head carrier 16 differ from item to item, and because the magnetic disc 1 expands or shrinks as the temperature and humidity change, when the video signals were recorded, the absolute reference recording track has an appreciable position error in itself.

So, the operator needs to carry out a tracking adjustment by turning the dial 8 to a position with the mark 8a out of registry with the "REC"-labelled position. That is, as the tracking dial 8 moves finely, the gear 53 finely turns the release lock disc 51 and the up-and-down cam 49 through the interconnecting gear 52, thereby the bell crank 46 is finely turned about the pivot pin 47. Such movement of the bell crank 46 is transmitted by the pin 48-and-number 32 connection to fine linear movement of the worm gear 30 in the direction A or the reversed one thereto. This causes fine rotative movement of the worm wheel 33 which is then transmitted through the screw 19-and-pin 20 connection to move the head carrier 16 in the direction parallel to the radius of the magnetic disc 1. Thus, a fine tracking adjustment of the magnetic head 15 is formed.

The making of such a tracking operation provides assurance of reproducing an image of good quality. When switched to the recording mode, however, the magnetic head 15 must be returned from the tracking-adjusted position for reproduction to the original absolute reference recording position by resetting the tracking dial 8 to the "REC"-position. Or otherwise, no recording operation could be initiated by pushing down the recording button 7, because in any other position than the "REC"-position, the pin 54 is hindered from closing the switch 57 by the release lock disc 51.

Referring next to FIG. 5, there are shown electrical circuit systems in the body 9 of the electronic camera, the body 13 of the auxiliary unit for reproduction and the device 5 for recording and reproduction.

Figure 5A:
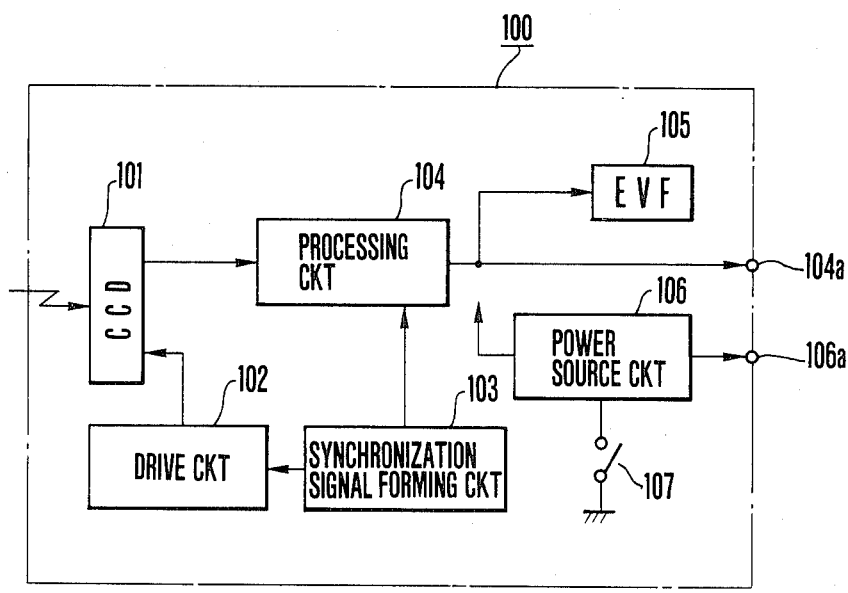
FIG. 5A is an electrical circuit diagram of the electronic camera body.

In FIG. 5A, the circuit system in the electronic camera body 9 is generally indicated at 100, including an image pickup element 101, such as CCD, for producing electrical signals representing an object image, a drive circuit 102 for the image pickup element 101, a synchronization signal forming circuit 103, a processing circuit 104 receptive of the output of the image pickup element 101 for producing video signals, an electronic viewfinder (EVF) 105, such as a CRT, receptive of the output of the processing circuit 104 for electronically displaying an object image, a power source circuit 106 and a power switch 107. The video signals from the processing circuit 104 are applied not only to the EVF 105 but also to an output terminal 104a. The electrical power from the power source circuit 106 is supplied to the internal circuit of the electronic camera body 9 and to an output terminal 106a. These two output terminals 104a and 106a are arranged to connect with input terminals of recording and power supply circuits of the circuit system in the device 5, respectively, when the device 5 is attached to the camera body 9.

Figure 5B:
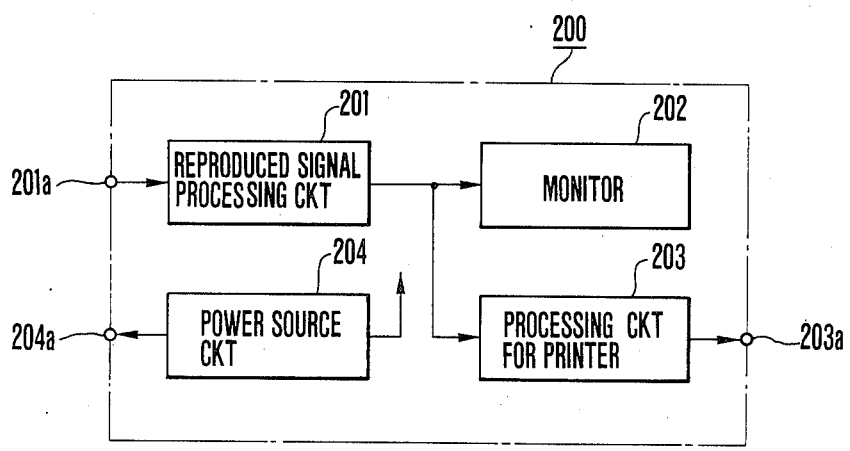
FIG. 5B is an electrical circuit diagram of the body of an auxiliary unit for reproduction.

In FIG. 5B, the electrical circuit system in the unit body 13 is generally indicated at 200, including a reproduced signal processing circuit 201 having an input terminal 201a to which a reproduced signal is supplied, a monitor 202, such as CRT, receptive of the output of the processing circuit 201 for viewing a reproduced image, and another processing circuit 203 receptive of the output of the first processing circuit 201 for producing signals usable in a printer, for example, at an output terminal 203a thereof. The input of the printer is connectable to this terminal 203a. A power source circuit 204 supplies electrical power to the internal circuit and an electrical power output terminal 204a. The input terminal 201a and output terminal 204a are arranged to connect with output and input terminals of a reproducing circuit and a power supply circuit of the device 5, respectively, when the device 5 is attached to the unit body 13.

Figure 5C:
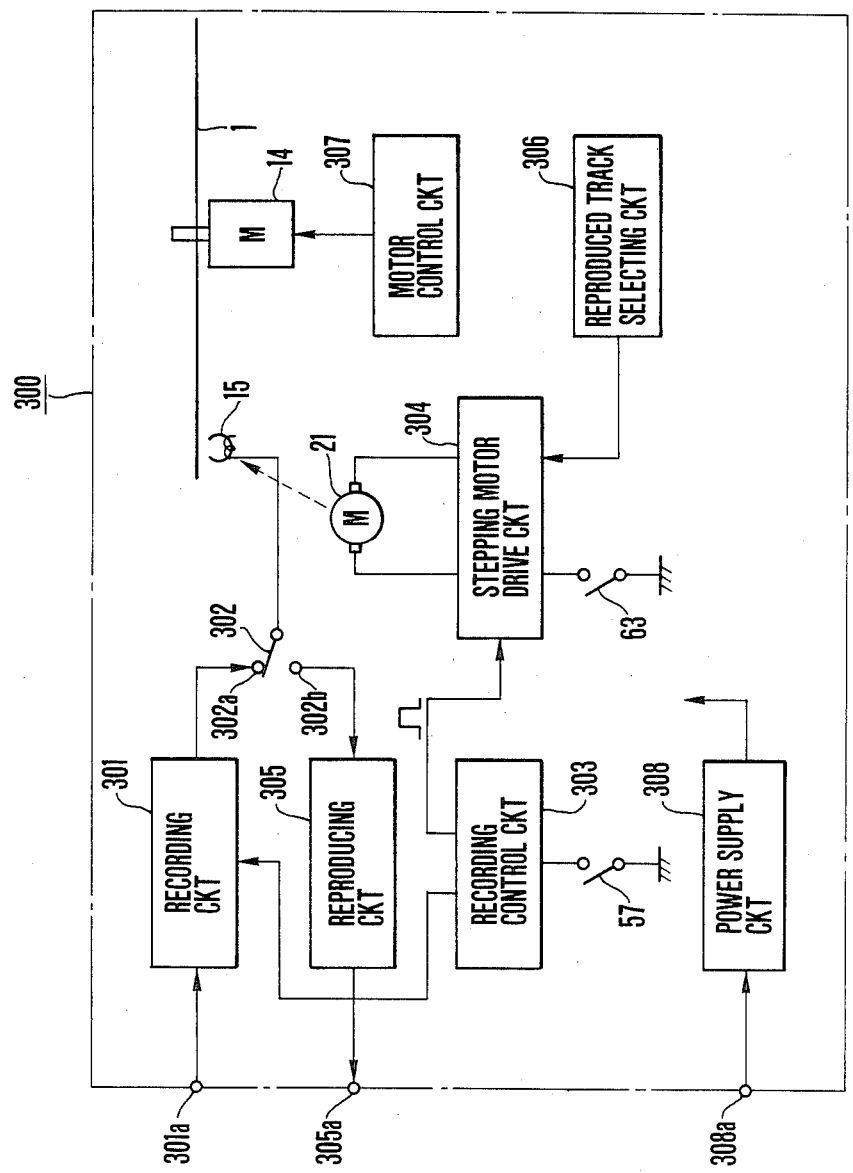
FIG. 5C is an electrical circuit diagram of the device for recording and reproduction.

In FIG. 5C, the circuit system of the device 5 is generally indicated at 300. An input terminal 301a is arranged to connect with the output terminal 104a for the video signal of the circuit system 100, an output terminal 305a for the reproduced signals to connect with the input terminal 201a of the circuit system 200, and another input terminal 308a for electrical power to connect with the output terminal 106a or 204a.

The circuit system 300 includes a recording circuit 301, a mode selector switch 302 having a movable pole with a throw 302a for the recording mode and another throw 302b for the reproduction mode, a recording control circuit 303 responsive to closure of the recording trigger switch 57 for causing the recording circuit 301 to record video signals for one field through the magnetic head 15 and responsive to termination of the recording operation of the one-field signals for producing a single pulse for moving the magnetic head 15 to the next recording track, and a drive circuit 304 for the stepping motor 21 responsive to the single pulse for energizing the stepping motor 21. Soon after the motor 21 starts to rotate, as the click gear 23 has rotated to a very small angle, the click recess 23d moves away from the lever nose 26a. It is at this time that the aforesaid pulse becomes low. And, when the nose 26a rides on the outer peripheral surface of the cam 23a, the tail of its lever 26 closes the switch 63. After that, the drive circuit 304 continues energizing the motor 21 until the click gear 23 rotates one revolution to allow the lever 26 to latch the cam 23a under the action of the spring 64 and to open the switch 63. In such a manner, the movement of the magnetic head 15 by one track pitch is accurately controlled.

305 is a reproducing circuit and 308 is a power supply circuit. When the circuit system 300 is connected to the circuit system 100 or 200, the power supply circuit 308 is supplied with electrical power from the power source circuit 106 or 204 of the system 100 or 200, respectively, thereby the internal circuit of the system 300 is supplied with electrical power. 306 is a reproduced track selecting circuit through which the stepping motor drive circuit 304 is actuated to change the track to be reproduced. A motor control circuit 307 adjusts the speed of rotation of the motor 14 to a prescribed value (3,600 rpm) when in either of the recording and reproducing modes.

The operation of the electrical circuit systems of such construction is as follows:

When recording, the device 5 is attached to the camera body 9, thereby the video signal output terminal 104a and the electrical power output terminal 106a are connected with the input terminals 301a and 308a, respectively. With the switch 302 set in the illustrated position 302a, when the power switch 107 is closed, the electrical power from the power source circuit 106 is given to the internal circuit of the system 100 and also through the power supply circuit 308 to the internal circuit of the system 300. An object image on the image pickup element 101 is scanned to produce signals which is then applied to the processing circuit 104. The video signals from the circuit 104 are applied to the electronic viewfinder 105 and also through the recording circuit 301 and switch 302 to the magnetic head 15, and are recorded on the magnetic disc 1 while being rotated at the prescribed speed by the motor 14 under the control of the motor control circuit 307.

In this case, the recording circuit 301 is controlled by the recording control circuit 303 responsive to closure of the recording trigger switch 57, shown in FIG. 4, in such a manner that video signals for one field are recorded through the magnetic head 15. Further this recording control circuit 303, responsive to termination of the recording of the one-field signals, produces the signal pulse for moving the magnetic head 15 to the next recording position. This pulse is applied to the stepping motor drive circuit 304. Responsive to that pulse, the circuit 304 rotates the stepping motor 21. Here, the duration of the pulse from the recording control circuit 303 is such that the click gear 23 is turned a very small angle by the rotation of the stepping motor 21 and the click lever is disengaged from the click recess 23d of the click cam 23a when the pulse becomes low.

Meanwhile, the click lever 26 is turned about the pivot pin 25 in the counterclockwise direction, thereby the switch 63 is turned on by the lever tail 26b. Thereby, the stepping motor drive circuit 304 continues rotating the stepping motor 21 until the click gear 23 rotates one revolution, the click lever 26 again latches the click cam 23a at the click recess 23d under the action of the spring 64, and the switch 63 is opened. In such a manner, the movement of the magnetic head 15 by one track pitch is controlled accurately.

When in reproduction, the device 5 is attached to the body 13 of the auxiliary unit for reproduction, thereby the input and output terminals 201a and 204a are connected with the output and input terminals 305a and 308a, respectively. The electrical power of the power source circuit 204 is applied to the internal circuit of the system 200 and also through the power supply circuit 308 to the internal circuit of the system 300. Also, the switch 302 is changed over to the position 302b and the magnetic head 15 is connected to the reproducing circuit 305. The reproduced output signals produced from the magnetic head 15 through the reproducing circuit 305 are applied to the reproduced signal processing circuit 201 of the circuit system 200, and the reproduced image can be viewed by the monitor 202.

When in reproduction, the track to be reproduced can be changed by actuating the stepping motor drive circuit 304 through the reproduced track selecting circuit 306.

It should be noted that though the foregoing embodiment has been described in connection with the device for recording and reproduction in the form of a unit releasably attachable to an auxiliary unit for recording, for example, the electronic camera, and also to an auxiliary unit for reproduction including the CRT display, it is also possible, as has been described above, to construct the device of the invention in the form of an intimate, inseparable part of the aforesaid recording apparatus body and/or the reproducing apparatus body.

Also though the foregoing embodiment of the invention has been described in connection with the magnetic type of the disc-shaped record bearing medium, the present invention is not confined to the magnetic type. It is to be understood that the present invention is applicable to the optical type and the electrostatic capacity type. Further the disc-shaped record bearing medium is applicable to other signals than the video signals, for example, data signals in floppy disc recording and/or reproducing apparatus.

As has been described in greater detail above, according to the present invention, recording with the recording and reproducing head off-set from the prescribed position for recording by the tracking when in reproduction can be avoided. Therefore, it is made possible to provide a device for recording and reproduction which can assure good interchangeability of the record bearing medium between apparatus.

Also, though, in the illustrated embodiment, the blocking of the recording button in response to setting of the dial 8 to any other position than the "REC"-position is effected mechanically by the release lock disc 51, an example of variation may be made such that instead of such a mechanical lock, a switch is arranged between the trigger switch 57 and the recording control circuit 303 to make when the dial 8 is in the "REC"-position and to break when out of that position. Of course, in this case, the recording button is operable at any time, but its operation is made effective by this newly provided switch only when the dial 8 is in the "REC"-position.

What is claimed is:

1. A device for use in recording a signal on and reproducing a signal from a record being medium, comprising:
 (A) a recording and reproducing head;
 (b) drive means for driving the record bearing medium;

(C) moving means for moving said head along the medium to position the head on each recording track on said medium;

(D) actuating means to start recording of a signal on said medium;

(E) adjusting means for adjusting the position of said head relative to said recording track using the position of said head relative to the track on said medium moved by said moving means as a reference position at a time of a reproduction, thus effecting a tracking adjustment of said head relative to said track; and (F) control means for allowing an operation of said actuating means only when said head is at said reference position.

2. The device according to claim 1, further comprising:
reproducing circuit means for reproducing a recorded signal from the medium through said head.

3. The device according to claim 2, further comprising:
output terminal means for providing a signal reproduced by said reproducing circuit means to the exterior connected to said output terminal means.

4. The device according to claim 1, further comprising:
recording circuit means for providing said head with a recording signal.

5. The device according to claim 4, further comprising:
input terminal means for supplying said record circuit means with a signal generated from external signal source means connected to said input terminal means.

6. The device according to claim 4, further comprising:
recording control circuit means responsive to said actuating means for putting said recording circuit means in an operative condition.

7. The device according to claim 6, further comprising:
input terminal means for supplying said recording circuit means with a signal generated from external signal source means connected to said device.

8. The device according to claim 1, further comprising:
recording circuit means for providing said head with a recording signal; and
reproducing circuit means for reproducing a recorded signal from the medium through said head.

9. The device according to claim 8, further comprising:
input terminal means for supplying said recording circuit means with a signal generated from external signal source means connected to said input terminal means; and
output terminal means for providing a signal reproduced by said reproducing circuit means to the exterior connected to said output terminals means.

10. The device according to claim 8, further comprising:
recording control circuit means for putting said recording circuit means in an operable condition responsive to said actuating means.

11. A system for recording a signal on and reproducing a recorded signal from a record bearing medium, comprising in combination:

(A) a recording and reproducing head;

(B) drive means for driving the record bearing medium;

(C) moving means for moving said head relative to the medium;

(D) recording circuit means for providing said head with a recording signal;

(E) manually operable actuating means to start recording of said signal;

(F) recording control circuit means for putting said recording circuit means in an operative condition responsive to said actuating means;

(G) reproducing circuit means for reproducing a recorded signal from the medium through said head;

(H) adjusting means for manually adjusting said head relative to a recording track on the medium moved by said moving means, thus effecting a tracking adjustment for said track, wherein a reference position is provided between said head and said track opposing thereto; and (I) control means for enabling an operation of said actuating means to be effective only when said adjusting means is set at said reference position.

12. A device for use in recording a signal on and reproducing a recorded signal from a magnetic disc, comprising:

(A) a magnetic head for recording the signal on and reproducing the recorded signal from the disc;

(B) a motor for rotating the disc relative to said head;

(C) a shifting mechanism for moving said head along a surface of the disc by a predetermined pitch at a time;

(D) a manual actuator for starting of recording;

(E) an adjusting mechanism for adjusting a position of said head relative to a recording track on the disc by moving said head minutely, said adjusting mechanism having a manual adjusting member for tracking adjustment and, at the same time, having a reference adjusting position of said head relative to said recording track; and (F) a control member for enabling operation of said actuator to be effective only when said adjusting member is set at a state to position said head at said reference position.

13. The device according to claim 12, further comprising:
a recording circuit for providing a recording signal to said head.

14. The device according to claim 13, further comprising:
a recording control circuit responsive to said actuator for causing said recording circuit to provide said recording signal to said head.

15. The device according to claim 13, further comprising:
a reproducing circuit for reproducing the recorded signal from the disc through said head.

16. A recording and reproducing device using a disk-shaped record bearing medium, comprising:

(A) a recording and reproducing head mounted on a head carriage;

(B) shifting means for shifting the head along the medium by moving the head carriage;

(C) driving means for rotating the medium;

(D) a recording actuator for starting of recording;

(E) tracking adjusting means for adjusting a position of the head relative to a recording track on the medium by moving the head carriage, said head having a prescribed reference position set relative to a recording track opposing thereto, and said tracking adjusting means adjusting the head relative to said reference position; and (F) control means for enabling operation of the recording actuator to be effective only when the adjusting means is set at a condition that said head is at said reference position.

17. A device according to claim 16, wherein said control means prohibits the operation of said recording actuator when said head is at a position other than a specific head position adjusted by said adjusting means.

18. A device according to claim 16, wherein said shifting means shifts said head carriage at a predetermined pitch.

19. A device according to claim 18, wherein said adjusting means adjusts said head position within a range not larger than the width of one track on said medium.

20. A device according to claim 19, wherein said adjusting means adjusts the position of the head relative to the track on said medium by finely moving the position of said head carriage.

21. A device according to claim 19, wherein said control means prohibits the operation of said recording actuator when said head is at a position other than a specific head position adjusted by said adjusting means.

22. A device for use in recording a signal on a magnetic medium, comprising:

(A) a magnetic head;
(B) drive means for driving the medium;
(C) head moving means for moving said head along the medium, said head moving means having adjusting means for adjusting a position of the head relative to a recording track of the medium, which has been placed at a position opposing to said head by said head moving means;
(D) recording means for recording signals on said medium by means of said head; and
(E) control means for enabling said recording means to operate only when said head is at a specific reference position relative to each recording track of the medium.

* * * * *